United States Patent [19]
Balling et al.

[11] 3,715,215
[45] Feb. 6, 1973

[54] SUCCESSIVE QUENCHING OF COFFEE DURING ROASTING

[75] Inventors: Theodore Thomas Balling, Danbury, Conn.; Richard J. Leonard, Wayne, N.J.; George Bernard Ponzoni, Spring Valley, N.Y.; Michael Gabriel Protomastro, Woodridge, N.J.; Arthur Stefanucci, Clifton, N.J.

[73] Assignee: General Foods Corporation, White Plains, N.Y.

[22] Filed: Sept. 25, 1970

[21] Appl. No.: 75,681

[52] U.S. Cl............................................99/68, 99/71
[51] Int. Cl..................................................A23f 1/02
[58] Field of Search......................................99/65, 68

[56] References Cited
UNITED STATES PATENTS

| | | | |
|---|---|---|---|
| 3,476,566 | 11/1969 | White et al. | 99/65 |
| 3,482,987 | 12/1969 | Pitchon et al. | 99/68 X |
| 2,614,043 | 10/1952 | Lenz | 99/68 |

*Primary Examiner*—Frank W. Lutter
*Assistant Examiner*—William L. Mentlik
*Attorney*—Jerome J. Norris, Bruno P. Struzzi and Thomas V. Sullivan

[57] ABSTRACT

Undesirable aroma components and gases can be removed from coffee beans during roasting by intermittent additions of moisture to the coffee during roasting, in amounts ranging from 3 percent to 40 percent by weight of the beans, thereby driving out the volatiles and unexpectedly improving the flavor. This process of upgrading coffee and changing its flavor characteristics occurs within the same roaster.

9 Claims, No Drawings

SUCCESSIVE QUENCHING OF COFFEE DURING ROASTING

BACKGROUND OF THE INVENTION

The present invention relates to a new and improved process for efficient removal of undesirable aroma components and gases from coffee, thereby improving coffee flavor.

It is well known that carbon dioxide and other gases retained in the roasted bean is not fully released upon grinding and presents problems in both roasted and ground coffee production as well as soluble coffee production. In packaging roasted and ground coffee the carbon dioxide retained in the bean is released gradually upon storage, necessitating the use of strong containers which can withstand the increase in pressure, while in soluble coffee production the carbon dioxide is released in the percolator columns presenting troublesome gas pockets and foam, which hinders the extraction operation. Additionally, it is well known that coffee contains certain harsh, tarry or earthy type of volatile flavor notes, which detract from the stability, flavor and aroma of coffee. Various types of coffee, depending upon the region and climate where harvested, characteristically contain higher or lower levels of these undesirable volatiles. It is, therefore, desirable that a simple and effective process be developed which can improve the flavor of all coffee beans without regard to the region in which they are grown and harvested and which would also alleviate the problems inherent in carbon dioxide retention in the beans.

It is an object of the invention to remove undesirable gases, inclusive of small quantities of carbon dioxide present in the coffee during roasting and prior to percolation by roasting said coffee in the presence of sufficient moisture to release substantial amounts of said carbon dioxide.

Another object of the invention is to improve the flavor of roasted coffees, especially low grade coffees of the Robusta variety and moderate grade coffees of the Santos variety, by removing objectionable, tarry, earthy and bitter flavor notes, by the application of moisture and heat during roasting of said coffees.

Still another object of the invention is to improve the flavor of roasted coffee, particularly coffees of the Robusta variety, by rejecting or modifying the undesirable aroma components in the presence of heat and moisture to effect a change in flavor of these aroma components and then collecting these aroma components.

A yet further object of the invention is to effect removal of undesirable aroma components and gases as they are developed during roasting and thereby eliminate additional equipment such as tempering bins and driers normally needed to effect removal of these undesirable substances after roasting.

Other objectives and advantages of the invention will be apparent in the description and claims hereinafter following.

SUMMARY OF THE INVENTION

It has now been discovered that the carbon dioxide content as well as the undesirable aroma content of roasted coffee beans can be substantially decreased by effecting intermittent quenching steps during the course of the coffee roasting process. Either one or more successive quenching steps may be employed during the course of the quench-during-roast process, provided that sufficient water is introduced to raise the moisture content of the beans to between about 3 percent and 40 percent thereby releasing the undesirable volatiles and carbon dioxide present in said beans.

The term quench as contemplated within the purview of the specification and claims will mean the addition of a substantial amount of water to the partially roasted beans, either in ground or whole bean form while said beans are preferably at an elevated temperature. Generally, the beans will have a product temperature of between 270°F. and 500°F. and be increased in moisture by about 15 percent, preferably around about 20 percent by weight of water.

Essentially, the invention involves contacting of the added moisture with objectionable aroma and gas components evolving from the interior portions of the bean and the use of the roasting heat to physically alter, chemically react with or merely volatilize the moisture and any absorbed gases and aromas from the coffee.

DETAILED DESCRIPTION OF THE INVENTION

In the preferred aspects of the inventive concept Robusta coffee beans are used. However, the successive quenching during roasting technique is also applicable to higher or moderate grade coffees such as Brazilian coffees. The roaster is typically charged with green coffee and the first step of the quenching operation is begun after the bean temperature reaches a point of about 270°F. or more.

The roasting process may either be batch or continuous, and the factors considered in determining the extent of roasting time, temperature conditions, and the amount of water employed in the intermittent quenching steps are not critical as long as the parameters of time, temperature, and amount of water used tends to maximize the qualities of best taste and produce a roast which is not unduly burnt. In general, the roasting temperatures may range from about 270°F. to 500°F. and the roasting times may vary up to about 17 minutes, where the cumulative amount of water added in the successive quenching steps total up to about 40 percent moisture.

If desired, a period of digestion or equilibration which extends over a period of 5 minutes may be tolerated where the first quench during the roasting step adds about 20 percent moisture. During such a step the roasting flame may be extinguished, diminished or continued. After the digestion or equilibration of the moisture within the bean, reroasting may be resumed to provide a driving force sufficient to evaporate off the undesirable aromatics from the bean. The product after completion of the roast may, if desired, thereafter be quenched utilizing conventional quenching processes such as an air quench or a combination of air and water quench.

The process is applicable to decaffeinated beans as well as non-decaffeinated beans, moreover, in the case of certain types of coffee such as good quality Brazilians, various volatile aroma fractions during the roasting operation may be collected by condensation and added either alone or together with other aromas to soluble coffee extract prior to or after drying.

The invention will now be described by reference to specific examples.

EXAMPLE I

A 30 pound charge of whole Robusta beans is introduced into a roasting cylinder and when the bean temperature reaches its exothermic reaction point between about 270°F. and 375°F. the moisture level is raised to between 10 percent to 20 percent by the first step quench. Thereafter during the course of the continuance of the roast the subsequent additional quenches are spaced over the course of the roasting until no more than a cumulative amount of about 40 percent moisture based on the weight of the beans is introduced. The roasting cylinder is equipped with means for agitating the beans during roasting and the cylinder is adapted to be heated by indirectly heated hot air passing through the beans. The beans are tumbled in the roasting cylinder for between 5 to 17 minutes until the desired degree of roast for optimum product quality is produced. Comparison of this coffee product with a controlled coffee product produced by air quenching after termination of the roast revealed some reduction in the $CO_2$ level of the beans quenched during roasting and a significant reduction in the bitter and tarry flavor notes of the percolated extract as compared to the control.

EXAMPLE II

Same as Example I except that the first quenching step introduced about 20 percent by weight of moisture, and the beans are permitted to equilibrate or digest the moisture for a period of about 5 minutes, during which the roasting flame is extinguished. Thereafter, roasting is resumed, thereby providing a driving force sufficient to remove undesirable aromatics. Following subsequent roasting and quenching to a standard moisture of 3 percent to 4 percent, comparison of the product with a controlled coffee product produced by air quenching after termination of the roast revealed a substantial reduction in the bitter, tarry flavor notes of the percolated extract as compared to the control.

EXAMPLE III

Same as Example I, except that good quality Brazilian coffee is employed, and the desirable vaporized aromas absorbed during the intermittent quenching steps are condensed, concentrated and then added to Brazilian percolated extract or Brazilian soluble coffee solids. Comparison of the product with a controlled Brazilian coffee produced by air quenching after termination of the roast revealed a substantial reduction in the undesirable flavor notes of the percolated extract as compared to the control.

Although the examples specifically delineate roasting under atmospheric conditions, it is to be understood that the invention contemplates roasting and quenching under superatmospheric conditions. Moreover, the designation of percent moisture will be understood throughout the ambit of this invention to encompass the addition of moisture sufficient to provide from about 3 percent to 40 percent moisture by weight of the coffee beans.

While the invention has been described by reference to specific examples, it is understood to be limited only by the scope of the appended claims.

What is claimed is:

1. A process for removal of gases and flavor characteristics from coffee during roasting, which comprises:
   a. charging green coffee to a roaster;
   b. heating the green coffee to about 270°F or more to partially roast the green coffee;
   c. adding water to quench the partially roasted coffee, contained in the roaster, in an amount to increase the moisture content ranging from about 3 – 40 percent by weight of the coffee;
   d. heating the partially roasted and quenched coffee to complete the roast; and
   e. cooling the roasted coffee; said moisturization and subsequent heating of the partially roasted coffee being effective to remove gases and aromas and improve coffee flavor.

2. The process of claim 1 wherein the completion of roasting after quenching is conducted under at least atmospheric conditions.

3. The process of claim 1 wherein roasting after quenching is continued until about less than 5 percent moisture is present in the roasted coffee.

4. The process of claim 1 wherein partially roasted, quenched coffee containing about 20 percent moisture is permitted to equilibrate for about 5 minutes, whereupon roasting is resumed and followed by an additional quench of about 10 percent moisture prior to completion of roasting.

5. The process of claim 1 wherein the added moisture and the aromas absorbed by said moisture are vaporized and discarded.

6. The process of claim 1 wherein the added moisture and aromas absorbed by said moisture are vaporized, collected, concentrated, and then combined with soluble coffee solids.

7. The process of claim 1 wherein the green coffee is heated to a temperature between about 270°F and 375°F to partially roast the coffee and wherein hot air is passed through the beans during the partial roasting and completion of roasting.

8. The process of claim 1 wherein the cooled roasted coffee is ground and percolated to give an improved soluble coffee.

9. The process of claim 8 wherein the aromas removed during quenching are combined with the soluble coffee.

* * * * *